United States Patent [19]

Andrews et al.

[11] Patent Number: 5,055,284

[45] Date of Patent: * Oct. 8, 1991

[54] METHOD FOR PRODUCING AMORPHOUS ALUMINOCARBONATE COMPOUNDS

[75] Inventors: Claude R. Andrews, Pasadena; John A. Kosin, Bel Air; Michael E. Tarquini, Havre de Grace, all of Md.

[73] Assignee: J. M. Huber Corporation, Rumson, N.J.

[*] Notice: The portion of the term of this patent subsequent to Dec. 19, 2006 has been disclaimed.

[21] Appl. No.: 95,456

[22] Filed: Sep. 11, 1987

Related U.S. Application Data

[63] Continuation-in-part of Ser. No. 811,230, Dec. 20, 1985, abandoned.

[51] Int. Cl.$^5$ .................... C01B 31/24; C01B 7/02; B01J 8/00
[52] U.S. Cl. .................... 423/419 P; 423/628; 423/DIG. 9; 424/686; 422/234; 261/DIG. 75
[58] Field of Search .................... 423/419 P, 430, 432, 423/628, 659, DIG. 9; 424/156; 422/234; 261/DIG. 75, 64

[56] References Cited

U.S. PATENT DOCUMENTS

| | | | |
|---|---|---|---|
| 1,740,441 | 12/1929 | Chogo et al. | 269/DIG. 75 |
| 1,808,956 | 6/1931 | Ketterer | 261/DIG. 75 |
| 2,058,503 | 10/1936 | Rafton et al. | 423/432 |
| 2,081,112 | 5/1987 | Statham et al. | 423/432 |
| 2,300,642 | 11/1942 | Booth | 261/DIG. 75 |
| 2,783,124 | 2/1957 | Grote | 423/419 P |
| 2,783,127 | 2/1957 | Grote | 423/419 P |
| 2,783,179 | 2/1957 | Grote | 423/419 P |
| 2,958,626 | 11/1960 | Schenck et al. | 423/419 P |
| 3,099,524 | 7/1963 | Grossmith | 424/156 |
| 3,268,387 | 8/1966 | Casciani et al. | 423/430 |
| 3,272,703 | 9/1966 | Rubino et al. | 424/156 |
| 3,502,441 | 3/1970 | Hudson | 422/234 |
| 3,539,306 | 11/1970 | Kumura et al. | 423/432 |
| 3,573,006 | 3/1971 | Kao Shih et al. | 423/641 |
| 3,730,700 | 5/1973 | Gruenveld | 423/659 |
| 3,900,314 | 8/1975 | Hulsebos | 423/659 |
| 3,960,175 | 6/1976 | Liepe et al. | 261/DIG. 75 |
| 3,975,503 | 8/1976 | Hauschild et al. | 423/421 |
| 4,145,398 | 3/1979 | Plass | 423/DIG. 9 |
| 4,207,180 | 6/1980 | Chang | 261/DIG. 75 |
| 4,234,560 | 11/1980 | Kuertew et al. | 423/DIG. 9 |
| 4,370,304 | 1/1983 | Hendriks et al. | 261/DIG. 75 |
| 4,560,545 | 12/1985 | Spickett et al. | 423/419 P |
| 4,576,819 | 3/1986 | Miyata et al. | 424/156 |

FOREIGN PATENT DOCUMENTS 090946 10/1983 European Pat. Off. ........ 423/419 P
19784 2/1982 Fed. Rep. of Germany .

Primary Examiner—Gary P. Straub
Attorney, Agent, or Firm—Harold H. Flanders; Alec H. Horn; Robert L. Price

[57] ABSTRACT

A method for producing amorphous aluminocarbonate compounds which comprises continuously recirculating a first aqueous solution from a reaction vessel through a recycle system and injecting a gas comprising carbon dioxide into the first solution at a turbulent area located in the recycle system. A second aqueous solution is added to the first solution while the gas injection is continued, and the pH of the resulting mixture is maintained in the approximate range of from 8 to 10. The gas injection is discontinued when the entire amount of the second solution has been added to the first solution, in order to allow further precipitation of the amorphous compound. The method is particularly adapted for producing amorphous sodium aluminocarbonate and sodium magnesium aluminocarbonate.

18 Claims, 1 Drawing Sheet

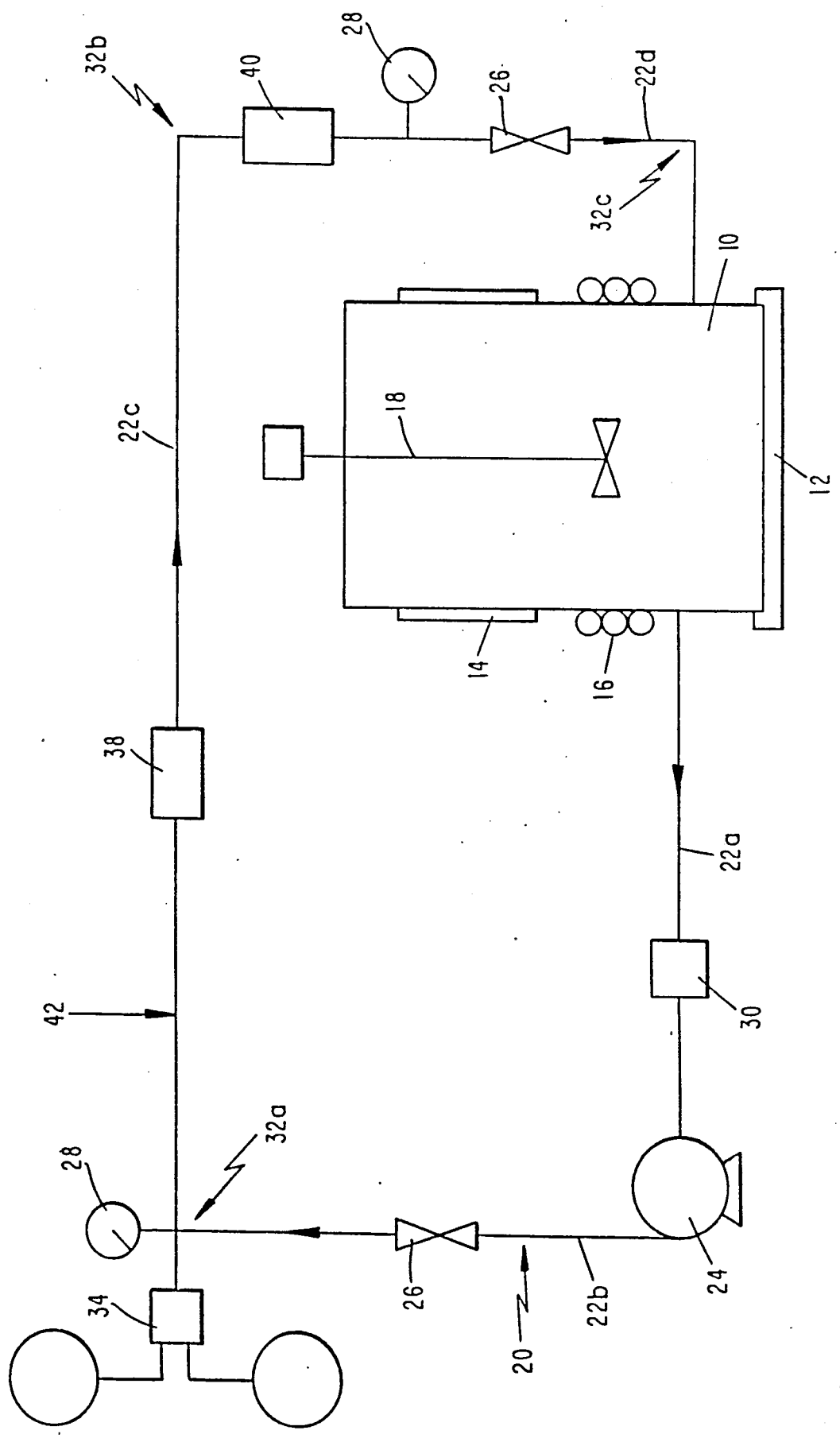

METHOD FOR PRODUCING AMORPHOUS ALUMINOCARBONATE COMPOUNDS

RELATED APPLICATIONS

This application is a continuation-in-part application of copending U.S. application Ser. No. 811,230 filed Dec. 20, 1985, now abandoned.

FIELD OF THE INVENTION

The present invention relates to methods for producing amorphous aluminocarbonate compounds, particularly sodium aluminocarbonate and sodium magnesium aluminocarbonate, wherein two solutions are combined in the presence of gaseous carbon dioxide. The present invention further relates to such methods wherein the efficiency of carbon dioxide utilization is improved.

BACKGROUND OF THE INVENTION

Various methods are known for producing aluminocarbonate compounds. For example, sodium aluminocarbonate, also known as dihydroxy aluminum sodium carbonate, may be made by a carbonate ($Na_2CO_3$)-alum ($Al_2(SO_4)_3$) reaction which comprises neutralizing sodium carbonate with clarified alum to a pH of 7 to 8. This process, however, produces a liquor containing $Na_2SO_4$ which requires further processing before disposal.

The German Patent No. 19,784 to Lowig discloses a method for producing sodium or potassium aluminocarbonates by simultaneously adding gaseous carbon dioxide and a sodium or potassium aluminate solution to a solution of sodium or potassium bicarbonate. Similarly, U.S. Pat. Nos. 2,783,124 and 2,783,127 to Grote disclose methods for the preparation of dihydroxy aluminum alkali metal or ammonium carbonate compounds by reacting an aluminum compound with the corresponding bicarbonate compound in the presence of water. Additionally, U.S. Pat. No. 2,783,179 to Grote discloses methods for producing isomeric aluminum hydroxy sodium carbonate compounds by the reaction between aluminum alkoxide and sodium carbonate in an aqueous medium wherein a copious quantity of carbon dioxide is bubbled through the solution and continued for the duration of the preparation.

U.S. Pat. No. 3,539,306 to Kumura et al discloses the preparation of an aluminum magnesium carbonate compound which comprises mixing an aluminum component with a magnesium component in an aqueous medium in the presence of carbonate ion at a pH of at least 8 and thereafter recovering the resultant precipitate. The required presence of carbonate ion in the reaction system can be effected by blowing carbon dioxide gas into the system or by addition of a carbonate. U.S. Pat. No. 2,958,626 to Schenck et al discloses methods for preparing aluminum magnesium carbonate compounds by mixing aluminum hydroxide or a derivative thereof with a solution containing magnesium bicarbonate in the presence of an excess of carbon dioxide. A steady stream of carbon dioxide is allowed to flow into the reaction solution through a gas dispersion tube.

U.S. Pat. No. 3,975,503 to Hauschild et al discloses a method for producing alkali carbonate wherein an alkali carbonate and alkali hydroxide containing solution stream is charged into a reaction chamber containing a carbon dioxide gas at a temperature from 150-750° C.

The known methods for preparing aluminocarbonate compounds have various disadvantages including low efficiency of carbon dioxide utilization, production of sulfate-containing byproducts and production of non-amorphous crystalline aluminocarbonate products.

SUMMARY OF THE INVENTION

Accordingly, it is an object of the present invention to provide a method for producing amorphous aluminocarbonate compounds. It is an additional object of the invention to provide a method for producing amorphous aluminocarbonate compounds wherein the efficiency of carbon dioxide utilization is improved over prior art methods and approaches 100%. It is a further object of the present invention to provide a sulfate-free method requiring relatively mild reaction conditions which may be varied to control the physical properties of the resultant amorphous aluminocarbonate compound. It is another object of the invention to provide amorphous aluminocarbonate compounds which may be used as flame retardants in various thermoplastic and thermoset polymer systems, and elastomers and/or as flame retardants in paper compositions.

These and other objects and advantages are satisfied by the method of the present invention in which a first aqueous solution is continuously recirculated from a reaction vessel through a recycle system. In accordance with a characterizing feature of the invention, a gas comprising carbon dioxide is injected into the first solution at a turbulent area located in the recycle system. A second aqueous solution is added to the first solution while the gas injection into the recirculating solution is continued, the pH of the resulting mixture being maintained in the approximate range of from 8 to 10. The gas injection is discontinued when the entire amount of the second solution has been added to the first solution and the solution recirculation is continued. The amorphous aluminocarbonate compound precipitates quickly and continuously as the reactants in the solutions are mixed together. The method is particularly adapted for producing amorphous alkali metal, e.g., sodium, aluminocarbonate, and amorphous alkali/alkaline earth metal, e.g., sodium magnesium, aluminocarbonate. The thus produced amorphous aluminocarbonate compounds are particularly useful as flame retarding fillers for various thermoplastic and thermoset polymers such as polyolefins, nylons, polyesters, polyvinylchlorides and elastomers, and as fillers for various paper compositions.

BRIEF DESCRIPTION OF THE DRAWING

The FIGURE discloses the flow diagram of the method according to the present invention.

DETAILED DESCRIPTION

The present invention relates to methods for producing amorphous aluminocarbonate compounds. In a preferred embodiment the invention relates to methods for producing amorphous alkali metal aluminocarbonates such as amorphous sodium aluminocarbonates and amorphous sodium magnesium aluminocarbonates. It is believed that sodium aluminocarbonates may be formed according to one or more of the following reactions:

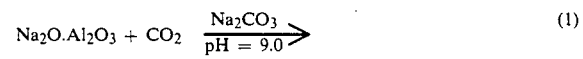
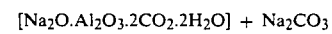

(1)

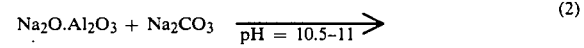

(2)

-continued

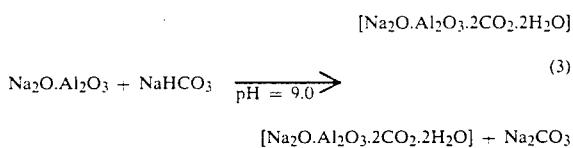

It is further believed that at least a portion of the added carbon dioxide reacts with sodium carbonate to form sodium bicarbonate during the above reactions.

In accordance with the present method and with reference to the Figure, a first aqueous solution containing a first reactant is provided in a reaction vessel 10. The reactor 10 includes means for maintaining the temperature of the first aqueous solution in a desired range. These means may be heating or cooling apparatus well known in the art and in the Figure are disclosed as a heating plate 12, a heating band 14 and a cooling coil 16. The reactor 10 is further provided with an agitator or stirrer 18 which maintains the solution in a homogeneous state.

The first aqueous solution which is provided in the reaction vessel preferably comprises an aqueous sodium carbonate solution. The solution generally contains 1-10% by weight sodium carbonate and preferably contains less than 7% by weight sodium carbonate.

In accordance with an important aspect of the invention, the first aqueous solution is continuously recirculated through a recycle piping system which is in communication with the reaction vessel. The recycle piping system 20 disclosed in the Figure removes solution from the reaction vessel 10, transports it through the various piping legs 22a–d of the system and then returns it to the reaction vessel. A pump 24, valves 26, pressure gauges 28 and at least one flow meter 30 may be included in the recycle piping system as is necessary.

The recycle piping system further includes at least one turbulent area. A turbulent area is defined as an area where turbulence or nonlaminar flow occurs in the flowing fluid. Turbulent areas may be the result of bends in the recycle piping system, such as bends 32a–c included in the recycle piping system set forth in the Figure. Alternatively, turbulent areas may be the result of impediments in the fluid flow path and/or inline mixers or other laminar flow disrupting devices.

In accordance with an important aspect of the present invention, a gas comprising carbon dioxide is injected into the first aqueous solution at one of the turbulent areas located in the recycle piping system. The injection of the carbon dioxide containing gas at a turbulent bend in the recycle piping system provides intimate mixing of the gas and the aqueous solution and the carbon dioxide utilization in the final aluminocarbonate compound product is greatly improved. In fact, according to the present method, carbon dioxide utilization in the final product approaches 100%. The carbon dioxide containing gas may comprise pure carbon dioxide or may include a mixture of carbon dioxide and air which is intimately mixed, for example in a gas flow meter/mixer 34, before injection into the aqueous solution at the turbulent area. Preferably, there is at least one in-line mixer 38, 40 which is located in the recycle piping system and arranged at or downstream of the turbulent area where the carbon dioxide is injected into the first aqueous solution. The in-line mixer provides further turbulence for intimate mixing of the gas and the aqueous solution.

The solution recirculation and the carbon dioxide gas injection is continued until the pH of the aqueous solution is in the approximate range of from 8 to 10. The pH must be maintained below 10 in order that a good yield of an amorphous aluminocarbonate compound is produced. The solution at this time is a mixture of sodium carbonate and sodium bicarbonate. Once the pH of the first solution is in the desired range, a second aqueous solution containing at east one second reactant is added to the first solution while continuing the injection of the carbon dioxide containing gas into the recirculating first solution. The addition rate of the second solution and the injection rate of the gas are adjusted in order to maintain the pH of the resulting mixture in the approximate range of 8 to 10. It is preferred that the pH value is maintained at a constant value during the reaction process.

In the preferred method for producing the amorphous aluminocarbonate compounds in accordance with the present invention, the second aqueous solution comprises sodium aluminate. A metal hydroxide may optionally be mixed with the sodium aluminate in the second aqueous solution in order to increase the stability of the sodium aluminate. The metal hydroxide is preferably an alkali metal hydroxide or an alkaline earth metal hydroxide, or a mixture of an alkali metal hydroxide and an akaline earth metal hydroxide. In the most preferred embodiments, the metal hydroxide comprises sodium hydroxide or magnesium hydroxide whereby the amorphous product comprises sodium aluminocarbonate or sodium magnesium aluminocarbonate.

The second aqueous solution may be added to the recirculating aqueous sodium carbonate solution in the recycle piping system or to the aqueous sodium carbonate solution in the reaction vessel. If the second aqueous solution is added to the recirculating solution, it is preferably added at a location downstream of the turbulent carbon dioxide injection area, for example at area 42 in the Figure. It is also preferred that if the second aqueous solution is added to the recirculating aqueous solution, it is added upstream of at least one in-line mixer, and thus it is most preferred that the second solution is added between the turbulent carbon dioxide injection area and a downstream in-line mixer.

When the entire amount of the second solution has been added to the first solution, the gas injection is discontinued. The solution recirculation through the recycle system is continued The reaction mixture is allowed to digest for a short period of time, for example, from about 5 minutes to about 1 hour, preferably about 15 minutes. The amorphous aluminocarbonate product precipitates from the reaction mixture during the course of the reaction. After digestion, the precipitated product may be filtered, water washed and dried. The dried aluminocarbonate product may then be milled in preparation for its end use.

As set forth previously, the first aqueous solution and the resulting reaction mixture both have a pH in the approximate range of from 8 to 10. The preferred pH is in the approximate range of from 8 to 9.5, thereby ensuring the production of an amorphous aluminocarbonate compound in a good yield. As will be discussed in detail below, variations in the pH of the aqueous solution and the resulting reaction mixture cause variations in the chemical composition and the physical properties of the resultant aluminocarbonate product.

Similarly, the chemical composition and the physical properties of the resultant amorphous aluminocarbonate compounds may be varied by varying the reaction temperature. It is preferred that the reaction temperature is in the approximate range of from 15° to 90° C. Temperatures greater than 90° C. cause a greater portion of the aluminocarbonate product to have a crystalline rather than amorphous structure. The effects of reaction temperature on the physical properties of the aluminocarbonate compounds will be discussed in further detail below.

The amorphous aluminocarbonate compounds produced according to the method of the present invention exhibit flame retardant properties and are particularly adapted for use as fame retardant fillers for various thermoplastic and thermoset polymers and elastomers. For example, the amorphous aluminocarbonate compounds of the invention are suitable for use as flame retardant fillers in polyolefins such as polypropylene and polyethylene, polyamides including nylons and polyadipamides, polyesters, elastomers, and polyvinylchlorides.

Additionally, the amorphous aluminocarbonate compounds of the invention are useful as fillers in paper compositions. The amorphous aluminocarbonates may be added to the paper compositions or furnish during manufacturing of paper products, and they provide the paper products with flame retardant properties. The amorphous aluminocarbonate products may be added to paper furnish compositions together with a surfactant to provide more homogeneous filled compositions.

Important features in the method of the present invention are the recirculation of the first aqueous solution through the recycle piping system and the injection of the carbon dioxide containing gas into the aqueous solution at a turbulent area in the recycle piping system. The combination of recirculation and carbon dioxide injection provides an improved and efficient use of the carbon dioxide during the process of forming the aluminocarbonate compound. In the method of the present invention, the carbon dioxide utilization approaches 100%. In contrast, the methods of the prior art wherein the carbon dioxide is sparged, bubbled or injected into the reaction mixture contained in the reaction vessel, carbon dioxide utilization is significantly reduced. This advantage of the present invention is set forth in the following examples In the examples and throughout the specification, parts are by weight unless otherwise indicated.

EXAMPLE 1

Sodium aluminocarbonate was prepared in both a laboratory batch size of 6 gallons and a pilot plant batch size of 30 gallons according to two different methods.

The first method was in accordance with the present invention wherein the first aqueous solution of sodium carbonate was continuously recirculated through a recycle piping system and carbon dioxide gas was injected into the recirculating solution at a turbulent area in the recycle piping system. Once the pH of the circulating solution was in the range of from 8 to 10, a second aqueous solution comprising a mixture of sodium aluminate and sodium hydroxide was added while continuing the injection of the carbon dioxide gas into the recirculating solution. The gas injection was discontinued when the entire amount of the second solution had been added to the first solution. Precipitation of the amorphous aluminocarbonate compound occurred during the addition of the second reagent.

The second method was in accordance with the methods of the prior art and differed from the first method in that the sodium carbonate solution was not recirculated through a recycle system but was contained within the reaction vessel. Additionally, the carbon dioxide gas was bubbled into the solution in the reaction vessel by means of a bent tube injector inserted therein.

Carbon dioxide efficiency measurements were taken during each reaction. A first sample was withdrawn just prior to the carbon dioxide introduction in order to determine a base line carbon dioxide concentration. The second sample was taken after the entire amount of the sodium aluminate solution had been added and the carbon dioxide gas flow had been discontinued. The total amount of carbonate carbon was determined in both samples. Using the volume of the batch and its specific gravity, the total carbonate carbon was calculated. The background carbonate carbon was subtracted from the total carbonate carbon in the product. By comparing the ratio of the total grams of carbon dioxide contained in the product to the total grams of carbon dioxide used in the reaction, a percent efficiency was calculated. These efficiency results are set forth in Table I.

TABLE I

COMPARATIVE CO$_2$ EFFICIENCY IN PRODUCING SODIUM ALUMINOCARBONATE

|  | Batch Size | Injection System | CO$_2$ Efficiency |
| --- | --- | --- | --- |
| Laboratory | 6 gal | Bent Tube | 37.6% |
| Laboratory | 6 gal | Recirculation | 80.6% |
| Pilot Plant | 30 gal | Bent Tube | 38.7% |
| Pilot Plant | 30 gal | Recirculation | 83.5% |

It is apparent from these results that the method according to the present invention including the recirculation and turbulent area injection steps is more than twice as efficient in carbon dioxide utilization than the methods of the prior art wherein the carbon dioxide is added to the reaction mixture in the reaction vessel. Both the laboratory and pilot plant studies are evidence of the improvements of the present invention. Amorphous sodium magnesium aluminocarbonate was also prepared in accordance with the method of the present invention and in accordance with the methods of the prior art in both laboratory and pilot plant batch sizes. Similar results were obtained wherein the method according to the present invention provided significantly improved carbon dioxide utilization as compared with the prior art method.

EXAMPLE 2

Various amorphous sodium aluminocarbonate (SAC) products were prepared in accordance with the following equation:

$$(Na_2O)_2 \cdot Al_2O_3 + 3CO_2 \xrightarrow[H_2O]{Na_2CO_3} [Na_2O \cdot Al_2O_3 \cdot 2CO_2 \cdot 2H_2O] + Na_2CO_3$$

and according to the method of the present invention. The reaction temperature was varied between 40° and 80° C. in order to determine the effect of temperature on the SAC product. The SAC was produced in accordance with the following general procedure. The first aqueous solution was prepared in the reaction vessel by dissolving solid $Na_2CO_3$ (644.12 grams, 4.0%) in water (15460.5 grams). Agitation was started at 150 rpm. Continuous recirculation of the sodium carbonate solution through the recycle piping system was initiated. Once the temperature of the solution had reached the desired reaction temperature using a hot plate for heating, carbon dioxide gas was injected into the system at a turbulent area in the recycle piping system.

A second aqueous solution was prepared by diluting Vinings VSA-45 sodium aluminate solution (1454.55 grams) with water (1508.6 grams) and adjusting the $Na_2O/Al_2O_3$ ratio with a 50% caustic solution (236.49 grams). This solution was heated to the desired reaction temperature and once the desired pH had been reached in the first aqueous solution, the second aqueous solution was pumped into the first solution. The desired pH was maintained by setting the carbon dioxide gas flow at a constant rate and adjusting the rate of the sodium aluminate solution as necessary. The carbon dioxide gas flow was continued at the initial rate throughout the procedure. As the sodium aluminate solution was introduced, the desired SAC product formed as a white precipitate. Once all the sodium aluminate solution had been added, the carbon dioxide gas injection was discontinued. The reaction mixture was allowed to digest for 15 minutes. The white amorphous SAC product was isolated by reduced pressure filtration and washed with water until the conductivity of the wash water was less than 4000 micro ohms, thereby reducing the level of the soluble byproduct contaminants. The washed filter cake was either oven dried or reslurried in water and spray dried. The dry product was milled by means of a hammer mill to yield the final product.

Table II sets forth the variations in the physical and chemical properties of the sodium aluminocarbonate product produced from the reactions performed at temperatures ranging from 40° to 80° C.

decreased, while the percentage of $Al_2O_3$ increased. Thus, it is believed that the formation of soluble salts of aluminum trihydrate increases at temperatures above 90° C., thereby causing a decrease in the production of sodium aluminocarbonate.

Finally, it is noted that the weight loss on ignition, LOI, is above 45% in each of the sodium aluminocarbonate samples. This is a measure of the loss of the carbon dioxide and water contained in the SAC product, which carbon dioxide and water act as fire extinguishing agents, and indicates that the SAC material is a suitable fire retardant material, for example, in various polymer and paper compositions.

The effect of varying the reaction pH value on sodium aluminocarbonate compounds was also determined. The reaction pH was varied from 7.8 to 11.0 and the effects of the pH variation are set forth in Tables III and IV.

TABLE III

CHEMICAL PROPERTIES OF SAC VERSUS REACTION pH

| Sample | Reaction pH | % $Na_2O$ | % $Al_2O_3$ | % $CO_2$ | XRD % Dawsonite |
|---|---|---|---|---|---|
| 6 | 7.8 | 20.64 | 29.60 | 26.4 | — |
| 7 | 8.0 | 22.44 | 28.49 | 29.3 | 8% |
| 8 | 8.5 | 22.71 | 28.12 | 30.3 | 6% |
| 9 | 9.0 | 20.91 | 32.96 | 29.7 | 7% |
| 10 | 9.5 | 20.18 | 29.94 | 28.9 | 11% |
| 11 | 10.0 | 17.43 | 35.56 | 26.4 | 10% |
| 12 | 10.5 | 2.95 | 67.27 | 3.0 | Amorphous |
| 13 | 11.0 | * | * | * | * |

*No data - No product isolated.

TABLE II

PHYSICAL AND CHEMICAL DATA OBTAINED ON SAC PRODUCED IN THE 30 GALLON REACTOR

| Sample | Reaction Temperature | LOI* | ABD** g/100 cc | % $Na_2O$ | % $Al_2O_3$ | % $CO_2$ | XRD % Dawsonite | Surface Area*** $m^2/g$ | Oil Absorption**** cc/100 g |
|---|---|---|---|---|---|---|---|---|---|
| 1 | 40° C. | 45.02 | 51.3 | 21.79 | 31.27 | 28.80 | 6 | 73 | 32 |
| 2 | 50° C. | 45.08 | 66.0 | 22.18 | 30.47 | 28.81 | 6 | 32 | 24 |
| 3 | 60° C. | 47.69 | 63.1 | 19.47 | 32.73 | 26.99 | 6 | 90 | 34 |
| 4 | 70° C. | 48.23 | 24.8 | 18.86 | 32.33 | 26.75 | 8 | 115 | 81 |
| 5 | 80° C. | 47.77 | 18.1 | 19.01 | 32.47 | 26.87 | 11 | 140 | 124 |

*LOI = Weight Loss on Ignition at 900° C.
**ABD = Apparent Bulk Density
***Surface area BET, monosorb instrument with $N_2$
****ASTM D-281 (spatula rub out procedure)

From Table II it is observed that an increase in reaction temperature above 50° C. caused an increase in both the surface area and oil absorption properties of the SAC product. Similarly, as the reaction temperature increased over this range, the amount of crystalline Dawsonite as measured by X-ray diffraction analysis in the final SAC product increased. Conversely, as the reaction temperature increased above 50° C., the apparent bulk density of the SAC product decreased. Thus, the physical properties of the SAC product may be controlled by varying the reaction temperature. It is further noted from Table II that the percentages of $Na_2O$, $Al_2O_3$ and $CO_2$ remain fairly constant over the temperature range. However, as the reaction temperature increased above 90° C., the percentage of $Na_2O$

TABLE IV

PHYSICAL PROPERTIES OF SAC VERSUS REACTION pH

| Sample | Reaction pH | LOI | Surface Area $m^2/g$ | Oil Absorption cc/100 g | Apparent Bulk Density g/100 cc |
|---|---|---|---|---|---|
| 6 | 7.8 | 43.3% | 71 | 26 | 81.11 |
| 7 | 8.0 | 43.3% | 67 | 18 | 94.73 |
| 8 | 8.5 | 43.3% | 55 | 19 | 97.54 |
| 9 | 9.0 | 44.2% | 69 | 17 | 101.46 |
| 10 | 9.5 | 42.6% | 92 | 71 | 26.92 |
| 11 | 10.0 | 43.9% | 91 | 34 | 74.24 |
| 12 | 10.5 | 27.6% | 240 | 146 | 24.53 |
| 13 | 11.0 | * | * | * | * |

*No data - No product isolated.

It is noted that no product was isolated at a reaction pH of 11.0. It is also noted that reactions carried out below a pH value of 8.0 and above a pH value of 10.0 resulted in products having lower carbon dioxide levels. Additionally, reactions carried out above a pH value of 10.0 produced products having lower $Na_2O$ levels and higher Al₂O₃ levels, again suggesting the formation of aluminum trihydrate as the major product. The LOI of the final products generally ranged from 43 to 44%, indicating the suitability of the material as a flame retardant. It is noted, however, that the LOI decreases markedly for products formed at pH values greater than 10.0. The surface area and oil absorption properties of the SAC products both increase significantly at higher pH values. Conversely, the apparent bulk density significantly decreases as the pH increases above 10.0.

It has also been determined that the initial concentration of sodium carbonate in the first aqueous solution affects both the chemical and physical properties of the resultant SAC product. For example, the carbon dioxide and Na₂O levels in the final product increase with an increasing sodium carbonate concentration and level off at a concentration of about 7.0%. Consequently, the Al₂O₃ level decreases with an increasing sodium carbonate concentration and similarly levels off at about 7.0%. The LOI value remains low, below 43%, at low concentrations of sodium carbonate but rises to an acceptable range of 43–45% when the sodium carbonate concentrations are between 1.0 and 5.0%. The LOI then decreases, below 43% at higher sodium carbonate concentrations.

EXAMPLE 3

A laboratory batch synthesis of sodium magnesium aluminocarbonate (SMAC) was performed using a 6 gallon system. A 2% sodium carbonate solution was prepared in the reactor and recycled through the recycle piping system at a rate of 6 gpm. The temperature during the reaction was maintained at 50° C. Carbon dioxide gas was injected at a turbulent area in the recycle piping system at a rate of 9 lpm until the pH of the sodium carbonate solution was in the appropriate range. A Mg(OH)₂ slurry and a sodium aluminate solution (from diluted Vinings VSA-45, 11.5% Al₂O₃ and 25.3% Na₂O) were then pumped simultaneously into the recycle piping system downstream of the turbulent injection area and upstream of a static mixer. The carbon dioxide injection was continued at 9 lpm and the pH of the batch was maintained in the range of 8–9 by adjusting the pumping rates of the Mg(OH)₂ slurry and the aluminate solution. When the entire amount of the Mg(OH)₂ and aluminate mixture was added, the carbon dioxide injection was discontinued. The batch was then digested for 15 minutes. The chemical analysis of the SMAC thus prepared was as follows: 44.7% LOI (25.7% CO₂ and 19.0% H₂O), 17.1% Na₂O, 26.6% Al₂O₃, 8.4% MgO. From this chemical analysis, the following empirical formula was derived:

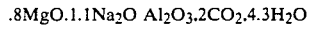

$.8MgO.1.1Na_2O\ Al_2O_3.2CO_2.4.3H_2O$

EXAMPLE 4

A 300 gallon pilot plant batch was then prepared following the same procedure as the previous laboratory size batch of Example 3, except that the Mg(OH)₂ and the sodium aluminate solution were not pumped into the recycle piping system but rather into the reactor itself. The carbon dioxide, however, was still injected at a turbulent area in the recycle piping system. The completed batch was spray dried and mixed. The chemical analysis of the resultant product was as follows: 46.1% LOI (22.6% CO₂ and 23.5% H₂O), 3.0% H₂O (surface), 11.3% Na₂O, 23.5% Al₂O₃, 13.0% MgO. The product had a surface area equal to 119 m²/g, an APS (Coulter counter) equal to 15.9 micrometers, a Gardner brightness equal to 94.4 and a pore/pack density eual to 0.22/0.24 g/ml. From the chemical analysis of this product, the following empirical chemical formula was derived:

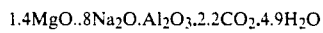

$1.4MgO..8Na_2O.Al_2O_3.2.2CO_2.4.9H_2O$

Both sodium magnesium aluminocarbonate products exhibited LOI values greater than 43%. This indicates a high loss of carbon dioxide and water weight on ignition or exposure to high temperatures associated with fire activity, whereby the product is desirable as a flame retardant material.

Thus, the method of the present invention provides a process for producing amorphous aluminocarbonate compounds having controlled chemical and physical properties while providing efficient carbon dioxide usage.

What is claimed is:

1. A method for producing aluminocarbonate compounds, comprising the steps of:
   (a) providing a first aqueous sodium carbonate solution in a reaction vessel;
   (b) continuously recirculating the aqueous sodium carbonate solution through a recycle piping system in communication with the reaction vessel;
   (c) injecting a gas comprising carbon dioxide into the recirculating sodium carbonate solution at a turbulent area located in the recycle piping system until the pH of the resulting aqueous carbonated sodium carbonate solution is in the approximate range of from 8 to 10;
   (d) adding a second aqueous solution comprising sodium aluminate to the aqueous carbonated sodium carbonate solution while continuing the injection of the gas into the recirculating solution, the addition rate of the second aqueous solution and the injection rate of the gas being adjusted to maintain the pH of the resulting mixture in the approximate range of from 8 to 10; and
   (e) discontinuing the gas injection when the entire amount of the second aqueous carbonated solution has been added to the aqueous sodium carbonate solution to allow precipitation of the aluminocarbonate compound.

2. A method for producing amorphous aluminocarbonate compounds according to claim 1, wherein the second aqueous solution comprises a mixture of sodium aluminate and a metal hydroxide.

3. A method as defined in claim 2, wherein the metal hydroxide comprises an alkali metal hydroxide.

4. A method as defined in claim 3, wherein the alkali metal hydroxide comprises sodium hydroxide and the amorphous product comprises sodium aluminocarbonate.

5. A method as defined in claim 2, wherein the metal hydroxide comprises an alkaline earth metal hydroxide and the amorphous product comprises sodium alkaline earth metal aluminocarbonate.

6. A method as defined in claim 5, wherein the metal hydroxide comprises magnesium hydroxide and the amorphous product comprises sodium magnesium aluminocarbonate.

7. A method as defined in claim 2, wherein the metal hydroxide comprises a mixture of sodium hydroxide and magnesium hydroxide.

8. A method as defined in claim 1, wherein the second aqueous solution is added to the aqueous carbonated sodium carbonate solution in the reaction vessel.

9. A method as defined in claim 1, wherein the second aqueous solution is added to the recirculating aqueous carbonated sodium carbonate solution in the recycle piping system.

10. A method as defined in claim 9, wherein the second aqueous solution is added to the recirculating aqueous carbonated sodium carbonate solution downstream of the turbulent injection area.

11. A method as defined in claim 10, wherein the second aqueous solution is added to the recirculating aqueous carbonated sodium carbonate solution upstream of an inline mixer.

12. A method as defined in claim 1, wherein the injected gas comprises pure carbon dioxide.

13. A method as defined in claim 1, wherein the injected gas comprises a mixture of carbon dioxide and air.

14. A method as defined in claim 1, wherein the temperature of the reaction is maintained in the range of approximately 15° to 50° C.

15. A method as defined in claim 1, wherein the temperature is maintained in the range of approximately 50° to 90° C.

16. A method as defined in claim 1, comprising the further steps of filtering, washing and drying the precipitated aluminocarbonate product.

17. A method as defined in claim 1, wherein the pH of the reaction mixture is maintained at a constant value.

18. A method as defined in claim 1, wherein the first aqueous sodium carbonate solution comprises no more than 7 percent sodium carbonate when provided in the reaction vessel.

* * * * *